United States Patent [19]

Demmer

[11] 4,406,278
[45] Sep. 27, 1983

[54] HEAT EXCHANGE ASSEMBLY FOR SWIMMING POOL

[76] Inventor: John Demmer, RD 2, Kingsley, Pa. 18826

[21] Appl. No.: 249,551

[22] Filed: Mar. 31, 1981

[51] Int. Cl.³ .............................................. F24J 3/02
[52] U.S. Cl. .................................. 126/416; 126/443; 126/446; 126/450
[58] Field of Search ................ 126/416, 443, 446, 450

[56] References Cited

U.S. PATENT DOCUMENTS

| | | | |
|---|---|---|---|
| 3,868,945 | 3/1975 | Konopka et al. | 126/426 |
| 4,078,546 | 3/1978 | Zani | 126/450 |
| 4,122,829 | 10/1978 | Lowe et al. | 126/450 |
| 4,124,018 | 11/1978 | Murray et al. | 126/435 |
| 4,187,831 | 2/1980 | Eubank | 126/435 |
| 4,280,328 | 7/1981 | Falconer | 126/443 |

*Primary Examiner*—Ronald C. Capossela
*Attorney, Agent, or Firm*—Neil F. Markva

[57] ABSTRACT

A heat exchange assembly comprises a solar heat collector panel adapted to be mounted on a portable support. The panel includes a rigid frame portion, an upper planar surface portion, a bottom planar surface portion and a planar, continuous tubular coil formed by a single, continuous tubular coil formed by a single, continuous tube member disposed between the upper and bottom surface portions. The upper planar surface portion includes a sheet of solar ray penetrating material and the bottom surface portion includes a sheet of rigid backing material. The rigid frame portion extends around the entire periphery of the panel to define the outer profile thereof. The rigid frame portion includes a channel which receives the outer edges of the upper sheet of solar ray penetrating material and the bottom, rigid backing sheet with the tubular coil disposed therebetween to fix the sheet of solar ray penetrating material, the tubular coil and the bottom surface portion into a unitary structural configuration. Specific features of the invention are directed to the particular structure of the channel member, the specific structure of the portable support and the particular interrelationship between the various elements of the overall assembly.

16 Claims, 7 Drawing Figures

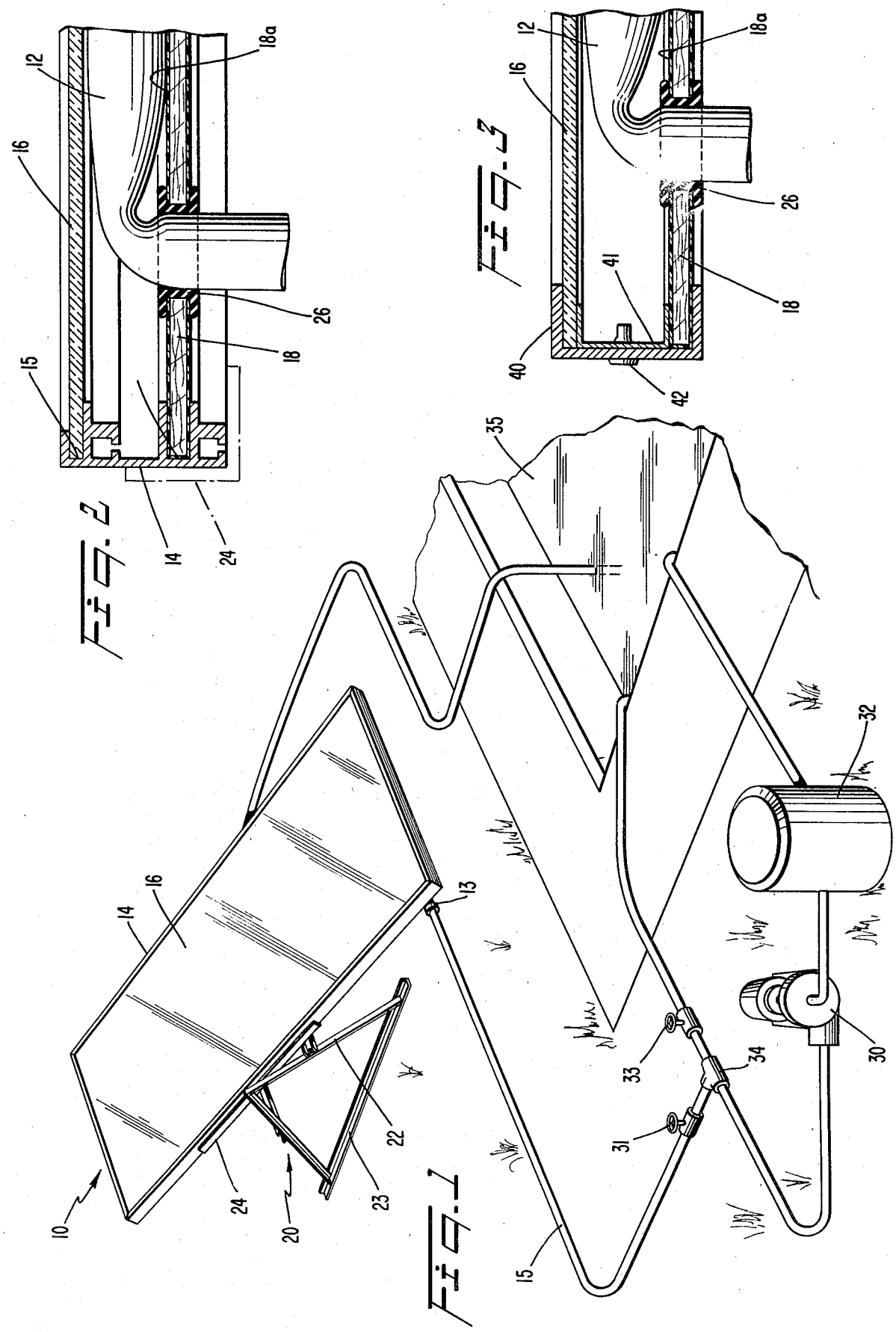

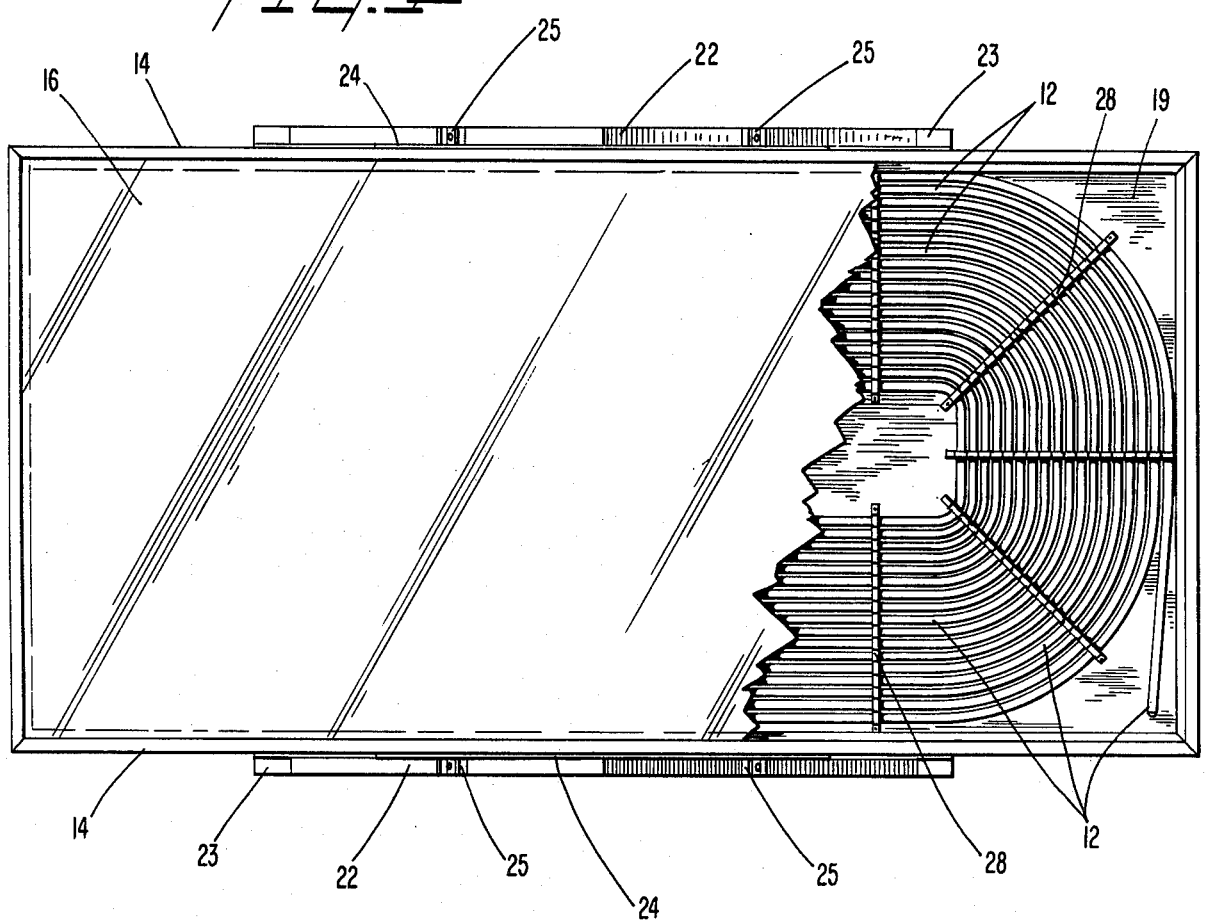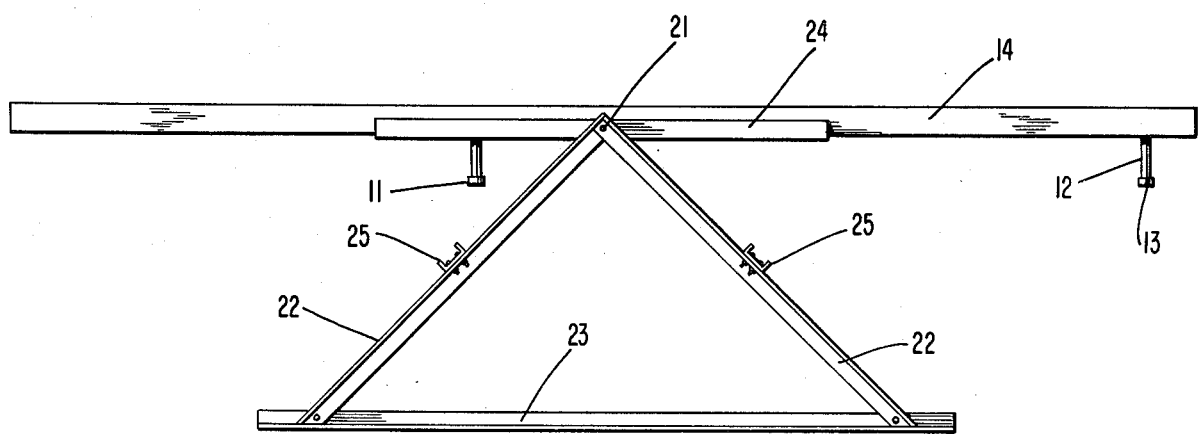

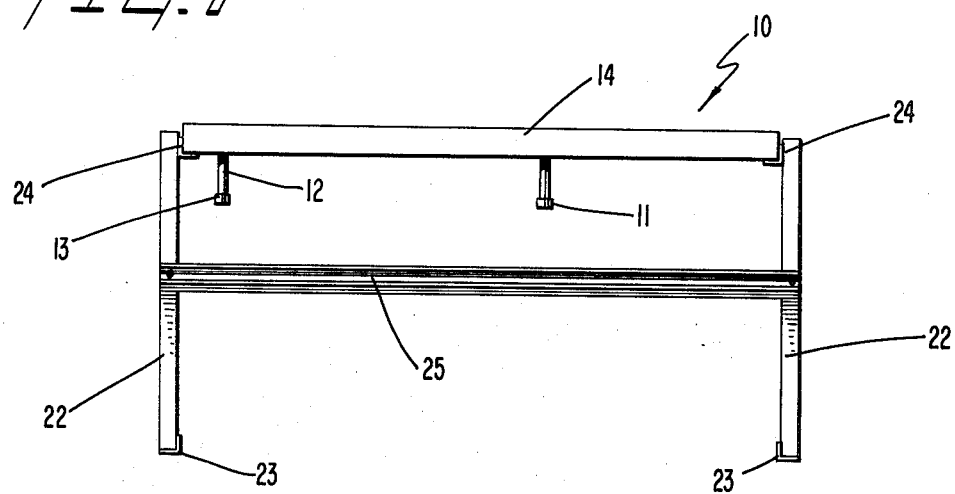
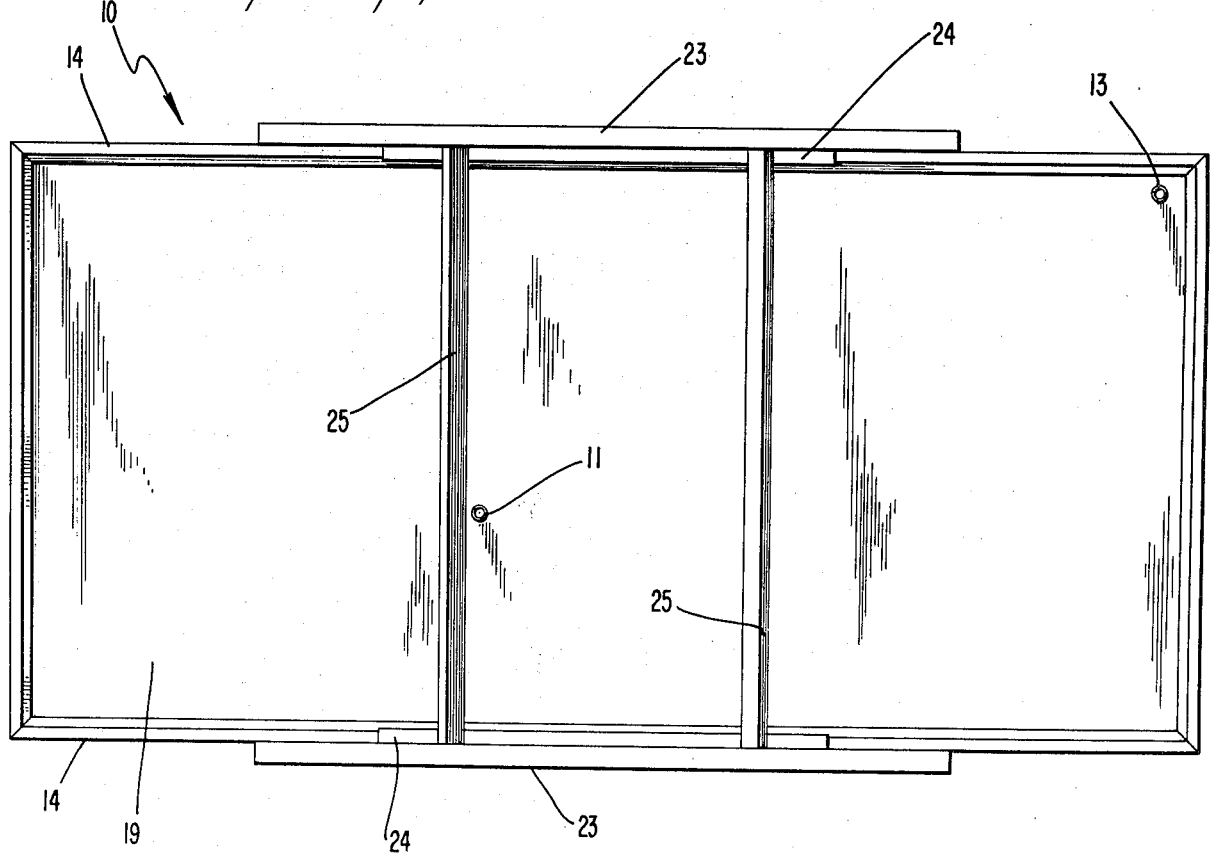

HEAT EXCHANGE ASSEMBLY FOR SWIMMING POOL

FIELD OF THE INVENTION

This invention relates to heat exchange assemblies for heating the water of swimming pools. More particularly, the invention relates to collecting the solar rays with a collector panel having a tubular coil disposed between a pair of rigid sheets wherein the upper sheet is composed of a solar ray receiving material.

BACKGROUND OF THE INVENTION

There have been numerous attempts to provide a solar collector system for the purpose of heating the water in swimmings pools. The U.S. Pat. Nos. 3,599,626 and 3,991,742 disclose heat transfer systems which are mountable on the top of buildings for the purpose of circulating the water of a swimming pool therethrough. These structures are permanently mounted and constitute somewhat complicated installations.

The portable heat exchange assemblies disclosed in U.S. Pat. Nos. 3,868,945 and 4,014,314 are also usable at the edge of a pool for heating the water therein. These particular structures however disclose very specially designed heating panels which are fixed in a particular disposition with respect to the surface on which it is supported. The U.S. Pat. No. 3,868,945 shows a panel unit mounted in conjunction with a fixed frame member. The U.S. Pat. No. 4,014,314 defines a continuous single conduit that is not disposed in any enclosure. The disadvantages associated with these prior art structures include the inability to follow the rays of the sun and to be protected from the elements that will adversely affect the heat retaining characteristics of the collector panel.

The U.S. Pat. Nos. 3,299,881, 3,985,117 and 4,089,326 show various ways in which a continuous tubular conduit is disposed within an enclosure. However, in each instance, further construction is required to operate the panel structure automatically or to provide a complex structure configuration that has no relationship to a support frame assembly.

The U.S. Pat. Nos. 4,108,154 and 4,185,615 disclose solar collector units which have automatic mechanisms for tilting the direction of the panel to track the solar radiation during daylight hours. These particular panels are very complicated and expensive to use and thereby require significant maintainence which is undesirable for the persons owning a swimming pool and attempting to maintain the temperature of the swimming pool in areas where the outside ambient temperature would normally preclude the use of a swimming pool.

PURPOSE OF THE INVENTION

The primary object of the invention is to provide a heat exchange assembly that is extremely simple in its construction and may be manipulated by hand to be tilted between opposed angles of inclination.

Another object of the invention is to provide an efficient solar energy absorbing device which may be easily constructed and has a particular relationship existing between a solar collector panel having a precise unitary structural configuration and the panel carrier section that is pivotally connected to a base section for a support assembly.

A still further object of the invention is to provide a solar unit having a unitary structural configuration for a panel having a rigid frame portion which fixes a sheet of solar ray penetrating material, a single tubular coil and a bottom surface portion with the inlet and outlet ends of the tubular coil extending through a side panel of the panel structure rather than the rigid frame portion.

SUMMARY OF THE INVENTION

The heat exchanger assembly as described herein includes a solar heat collector panel means mounted on a portable support means. The support means includes a panel carrier section and a base section. The collector panel means is formed into a unitary structural configuration which is resting against the panel carrier section which, in turn, is pivotally connected to the base section of the support means. In one specific embodiment, the unitary structure of the panel is supported in sliding contact with the panel carrier section.

The unitary panel means includes a rigid frame portion defining the outer profile of the panel means, an upper solar ray receiving surface portion, a bottom planar surface portion and a planar, continuous tubular coil disposed between the upper and bottom surface portions. The upper planar surface portion comprises a sheet of solar ray penetrating material. The panel carrier section of the support means includes means for contacting the rigid frame portion of the panel means. Thus, the panel means is tiltably supported between opposed angles of inclination to receive solar rays over the period of an entire day.

The unitary panel means has a size and a shape which may be manipulated by a single person from one angle of inclination to another angle of inclination. Thus, due to the simplicity of the structure of the present invention, there is no requirement of having any automatic sun tracking mechanism such as is provided in the numerous prior art structures.

A particular feature of the invention requires the rigid frame portion to extend around the entire periphery of the panel means. The rigid frame includes a channel means for receiving the outer edge of the sheet of solar ray penetrating material. The bottom surface portion of the panel means includes a sheet of rigid backing material having its outer edge received by the channel means. The sheet of backing material is covered with a film of heat absorbing material.

A further feature of the invention is the specific configuration of the support having a base section including two upright frame segments laterally spaced with respect to each other. Carrier panel section is pivotally attached to each of the upright frame segments. When the panel means is in place on the carrier section, it is disposed between the upright frame segments. Flexible strips of material are used to fix the individual coils of the tubular coil against the sheet of rigid backing material within the unitary panel structure.

BRIEF DESCRIPTION OF THE DRAWINGS

Other objects of this invention will appear in the following description and appended claims, reference being made to the accompanying drawings forming a part of the specification wherein like reference characters designate corresponding parts in the several views.

FIG. 1 is a perspective view showing the heat exchange assembly disposed at the edge of a swimming pool;

FIG. 2 is a fragmentary sectional view of a solar collector panel made in accordance with this invention;

FIG. 3 is a fragmentary sectional view of another embodiment of a solar collector panel made in accordance with this invention;

FIG. 4 is a fragmentary top plan view of a heat exchange assembly made in accordance with this invention;

FIG. 5 is a side elevational view of the heat exchange assembly shown in FIG. 4;

FIG. 6 is an end elevational view of the assembly shown in FIG. 4; and

FIG. 7 is a bottom plan view of the heat exchange assembly as shown in FIG. 4.

DETAILED DESCRIPTION

The solar heater collector panel, generally designated 10, is pivotally disposed on the support mechanism, generally designated 20. The solar collector panel 10 includes a rigid frame portion 14 defining the outer profile of the panel. An upper planar surface portion 16 is composed of a sheet of solar ray penetrating material. In this specific embodiment, the surface portion 16 is formed of a rectangular sheet of Plexiglass ⅛ inch thick and having an outer dimension of 4 feet by 8 feet. The bottom planar surface portion is composed of a particle, marine board 18 covered by a heat absorbing film 18a. The film 18a in this particular embodiment is a sheet of black plastic material. The board 18 is ¼ inch thick and has an outer dimension of 4 feet by 8 feet. The outer edges of the sheet 16 are received by the channel 15 in the frame portion 14. The outer edge of the marine board 18 is received in the channel 17 formed within the rigid frame 14.

The rectangular panel 10 has four pieces of extruded rigid frame portions 14 connected at their corners in a well known manner. That is, the specific embodiment as disclosed herein uses aluminum extruded materials which are joined along 45° angles by standard clip members in a manner well known in the prior art. The end of the conduit 12 extends through the back portion panel 18 through an opening that is lined with a grommet or bushing 26 as shown. Thus, there are no connectors that are required to extend through the rigid frame portions 14.

A single piece of polyvinyl chloride hose is coiled in the longitudinal manner between the solar ray receiving material sheet 16 and the marine panel 18. A plurality of flexible strips 28 of material are stapled in place between the adjacent coils of the hose 12. The flexible strips are stapled against the marine board 18 which constitutes the backing for the bottom surface portion of the panel 10. Coupling members 11 and 13 are attached to the outlet and inlet end portions of the hose 12. In this specific embodiment, the single piece of hose 12 is 325 feet long and has a ⅜ inch outside diameter. This contains about 8 gallons of water when it is filled.

As can be seen, the rigid frame portion 14 defines the outer profile of panel 10 and fixes the solar ray penetrating sheet 16, the tubular coil 12 and the bottom surface portion 18, 18a into a unitary structural configuration. The solar heat collector panel 10 is mounted on the portable support assembly 20.

Two angular elements 24 are pivotally disposed on laterally displaced upright frame segments 22. The panel carrier section elements 24 are in sliding contact with the rigid frame portion 14 on opposed sides of the panel 10. The upright frame segments include the angular runner elements 23 and cross support members 25. With this particular configuration, the panel 10 may be disposed at various angles of inclination and may be longitudinally adjusted along the length of the carrier section elements 24. This simple construction also enables the placement of the heat exchange assembly in various types of topographical locations and is easily adjusted by hand with only one person being required to make such an adjustment. The panel 10 is shown in FIG. 1 connected to the conventional water circulation system used to filter the water in the swimming pool 35. A pump 30 circulates the water from pool 35 through the filter device 32. Valve 33 controls the amount of water circulation through the system. A T connection 34 may be used to interconnect the line 15 attached to the coupling 13 of hose 12 inside panel 10. When valve 31 is opened, the circulation of water is automatically directed through the panel 10 and fed by gravity to return into the swimming pool 35. The valve 33 may be completely closed to have all of the water be directed through panel 10 after having passed through filter unit 32.

In the embodiment as shown in FIG. 3, the solar ray receiving sheet 16 and the marine board 18 covered with film 18a are held in place within an extruded channel 40 by the extruded channel member 41. The channel member 41 is held in place along the length of the channel 40 by the fastening elements 42. It is clear that the channel element 41 may be short segments laterally spaced along the length of the channel 40 or may be a complete channel extending the total length of the extruded rigid frame member 40.

While the heat exchange assembly for swimming pool has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. A heat exchange assembly for heating the water of a swimming pool, said assembly comprising:
   (a) a solar heat collector panel means mounted on a portable support means,
   (b) said support means including a panel carrier section and a base section,
   (c) said panel means including a rigid frame portion, an upper planar surface portion, a bottom planar surface portion and a planar, continuous tubular coil formed by a single, continuous tube member disposed between the upper and bottom surface portions,
   (d) the upper planar surface portion including a sheet of solar ray penetrating material and the bottom surface portion including a sheet of rigid backing material,
   (e) the rigid frame portion extends around the entire periphery of the panel means to define the outer profile of the panel means,
   (f) the rigid frame portion includes channel means for receiving the outer edges of the upper sheet of solar ray penetrating material and the bottom, rigid backing sheet with the tubular coil disposed therebetween to fix the sheet of solar ray penetrating material, the tubular coil and the bottom surface portion into a unitary structural configuration,
   (g) the panel carrier section including means contacting the rigid frame portion and being pivotally connected to the base section to tiltably support the panel means between opposed angles of inclination, (h) said unitary panel means has a size and shape to be manipulated by one person from one angle of inclination to another angle of inclination.

2. An assembly as defined in claim 1 wherein the sheet of solar ray penetrating material is composed of an acrylic resin material.

3. An assembly as defined in claim 1 wherein the bottom surface portion includes a sheet of backing material covered with a film of heat absorbing material.

4. An assembly as defined in claim 1 wherein the base section includes two upright frame segments laterally spaced with respect to each other, the panel carrier section is pivotally attached to each of the upright frame segments.

5. An assembly as defined in claim 4 wherein the panel means is disposed on the panel carrier section and between the upright frame segments.

6. An assembly as defined in claim 1 wherein the tube member has an inlet end portion and an outlet end portion, the end portions extend through openings located in the bottom surface portion of the panel means.

7. An assembly as defined in claim 6 wherein the single, continuous tube member is composed of a polyvinyl chloride material.

8. An assembly as defined in claim 6 wherein flexible strips of material fix the individual coils of the tube member against the sheet of backing material.

9. An assembly as defined in claim 1 wherein the panel means has a rectangular outer profile, the panel carrier section includes a pair of angular elements shaped to fit the rigid frame portion on opposite sides of the panel means.

10. An assembly as defined in claim 1 wherein the channel means includes a first channel section which receives the outer edge of the sheet of solar ray penetrating material at the upper surface of the panel means and a second channel section which receives the outer edge of the sheet of rigid backing material at the bottom surface of the panel means.

11. An assembly as defined in claim 10 wherein the rigid frame portion comprises extruded frame sections having a one piece cross section which includes said first and second channel sections.

12. An assembly as defined in claim 10 wherein the rigid frame portion comprises an outer, extruded U-shaped frame section and a correspondingly shaped inner, extruded U-shaped frame section connected to said outer frame section to form the first and second channel sections therebetween.

13. An assembly as defined in claim 10 wherein the tubular coil is fixedly disposed between the sheets of solar penetrating material and rigid backing material when said sheets are located in said respective first and second channel sections.

14. A heat exchange assembly for heating the water of a swimming pool, said assembly comprising:
(a) a solar heat collector panel means for mounting on a support means,
(b) said panel means including a rigid frame portion, an upper planar surface portion, a bottom planar surface portion and a planar, continuous tubular coil formed by a single, continuous tube member disposed between the upper and bottom surface portions,
(c) the upper planar surface portion including a sheet of solar ray penetrating material and the bottom surface portion including a sheet of rigid backing material,
(d) the rigid frame portion extends around the entire periphery of the panel means to define the outer profile of the panel means,
(e) the rigid frame portion includes channel means for receiving the outer edges of the upper sheet of solar ray penetrating material and the bottom, rigid backing sheet with the tubular coil disposed therebetween to fix the sheet of solar ray penetrating material, the tubular coil and the bottom surface portion into a unitary structural configuration,
(f) the channel means includes a first channel section which receives the outer edge of the sheet of solar ray penetrating material at the upper surface of the panel means and a second channel section which receives the outer edge of the sheet of rigid backing material at the bottom surface of the panel means,
(g) the tubular coil is fixedly disposed between the sheets of solar penetrating material and rigid backing material when said sheets are located in said respective first and second channel sections.

15. An assembly as defined in claim 14 wherein the rigid frame portion comprises extruded frame sections having a one piece cross section which includes said first and second channel sections.

16. An assembly as defined in claim 14 wherein the rigid frame portion comprises an outer, extruded U-shaped frame section and a correspondingly shaped inner, extruded U-shaped frame section connected to said outer frame section to form the first and second channel sections therebetween.

* * * * *